United States Patent
Haraguchi et al.

(10) Patent No.: US 8,355,061 B2
(45) Date of Patent: Jan. 15, 2013

(54) IMAGE RECORD APPARATUS AND IMAGE RECORD METHOD FOR CALCULATING AND SETTING A PRE-RECORD VOLUME

(75) Inventors: Takayuki Haraguchi, Tokyo (JP); Kentaro Ohkawa, Tokyo (JP); Kenichiro Sugimoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 12/673,830

(22) PCT Filed: Feb. 24, 2009

(86) PCT No.: PCT/JP2009/000818
§ 371 (c)(1),
(2), (4) Date: Feb. 17, 2010

(87) PCT Pub. No.: WO2009/107368
PCT Pub. Date: Sep. 3, 2009

(65) Prior Publication Data
US 2011/0050936 A1     Mar. 3, 2011

(30) Foreign Application Priority Data

Feb. 29, 2008   (JP) ............................... P2008-050277

(51) Int. Cl.
*H04N 5/76*       (2006.01)
(52) U.S. Cl. ..................... 348/231.2; 348/159; 386/223; 386/229
(58) Field of Classification Search ............. 348/207.99, 348/211.3, 231.3, 231.1, 143, 159, 231.2; 386/223, 226, 228, 229, 242, 328, 224
See application file for complete search history.

(56) References Cited

U.S. PATENT DOCUMENTS 6,859,609 B1 *   2/2005   Watkins ........................ 386/242
(Continued)

FOREIGN PATENT DOCUMENTS
EP         1298927 A1    4/2003
(Continued)

OTHER PUBLICATIONS

Supplementary European Search Report for PCT/JP2009000818 dated Nov. 30, 2010.
(Continued)

*Primary Examiner* — Nelson D. Hernández Hernández
*Assistant Examiner* — Dennis Hogue
(74) *Attorney, Agent, or Firm* — Pearne & Gordon LLP

(57) ABSTRACT

An object of the invention is to provide an image record apparatus and an image record method that can improve the use efficiency of a record medium for recording a video image from a camera. A NW control section (141) acquires the image quality and the resolution set in a camera (10) performing pre-record and calculates the maximum image size that can be transmitted by the camera (10), and a file system (142) calculates the number of images from the preset pre-record rate and pre-record time and reserves an area corresponding to the maximum image size of one pre-record image calculated by the NW control section (141) in an HDD (146). The NW control section (141) records a pre-record image transmitted from the camera (10) in the area reserved by the file system (142). When it records as many pre-record images as the number of pre-record images, it returns to the beginning of the area reserved by the file system (142) and continues recording a pre-record image is continued. When an alarm occurs while a pre-record image is recorded, the NW control section 141 determines that the pre-record image at the point in time is pre-record data.

5 Claims, 4 Drawing Sheets

U.S. PATENT DOCUMENTS

| | | |
|---|---|---|
| 2003/0044168 A1* | 3/2003 | Matsukawa .................... 386/117 |
| 2003/0108327 A1* | 6/2003 | Sunagawa ....................... 386/46 |
| 2005/0044501 A1 | 2/2005 | Obata et al. |
| 2006/0088294 A1* | 4/2006 | Nakano et al. ................. 386/111 |
| 2007/0035632 A1* | 2/2007 | Silvernail et al. .......... 348/211.3 |

FOREIGN PATENT DOCUMENTS

| | | |
|---|---|---|
| JP | 10-049989 A | 2/1998 |
| JP | 10-066061 A | 3/1998 |
| JP | 2004-140575 A | 5/2004 |
| JP | 2004-355041 A | 12/2004 |
| JP | 2005-149371 A | 6/2005 |
| JP | 2005-151505 A | 6/2005 |

OTHER PUBLICATIONS

International Search Report for PCT/JP2009/000818, dated May 26, 2009.

* cited by examiner

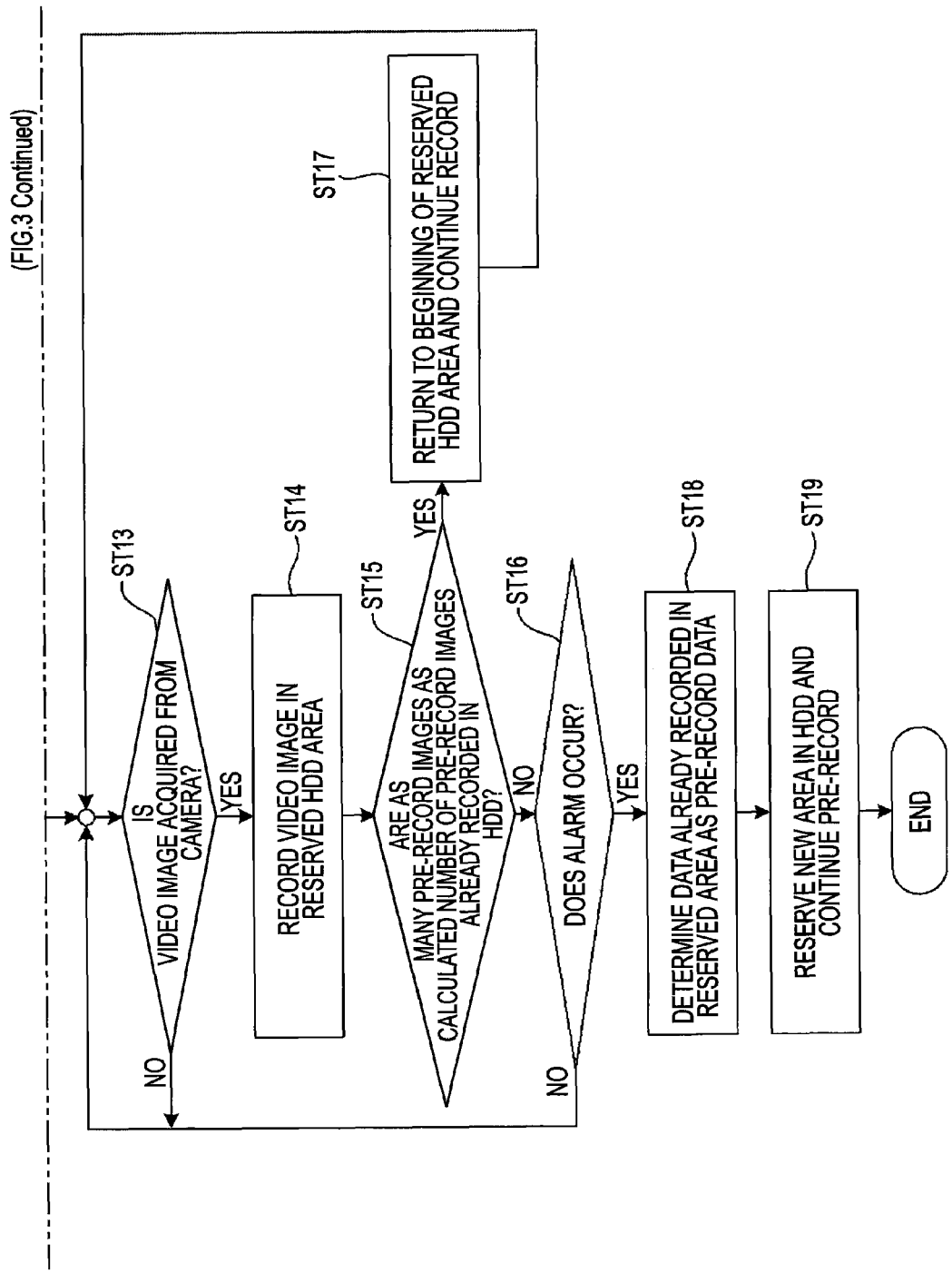

IMAGE RECORD APPARATUS AND IMAGE RECORD METHOD FOR CALCULATING AND SETTING A PRE-RECORD VOLUME

TECHNICAL FIELD

This invention relates to an image record apparatus and an image record method suitable for use with a monitoring camera system.

BACKGROUND ART

A conventional image record apparatus used with a monitoring camera system has a pre-record function of recording an image before an alarm occurs (for example, refer to Patent Document 1).

To perform pre-record, since the alarm occurrence timing is not previously known, an area of 8 MB (mega bytes)× integer, for example, is previously reserved in a record medium of a hard disk, etc., ad image data is recorded in the area. When an alarm occurs, the image data recorded so far in the reserved area is determined as the pre-record data.

Usually, a plurality of cameras are used in a monitoring camera system and thus the cameras and the image record apparatus are connected through a network of Ethernet (registered trademark), etc. The image record apparatus records an image sent from each camera in a record medium. Since the image sent from the camera is compressed, the image record apparatus does not grasp the image size until reception of the image from the camera.

The size of the area reserved for pre-record data is determined when the record medium is formatted. In the conventional image record apparatus, the area reserved for pre-record data is determined according to the following procedure:

(1) First, the size of one image is set to 512 kB and is multiplied by the pre-record rate and the pre-record time. That is, 512 kB×pre-record rate×pre-record time is calculated.

(2) The value calculated in (1) is rounded up so as to become a value of 8 MB×an integer. For example, when the pre-record rate is 5 ips (Image per second) and the pre-record time is 4 sec, the calculation result in (1) becomes 10.24 MB (512 kB×5 ips×4 sec).

(3) According to the result, 10.24 MB is rounded up to 16 MB and an area is reserved in the record medium.

Patent Document 1: JP-A-2005-151505

DISCLOSURE OF THE INVENTION

Problems To Be Solved By the Invention

However, when the actual image size is 48 kB, the maximum image size that can be transmitted by the camera becomes 58 kB from the resolution and the image quality of the camera and the following size becomes the necessary size:

58 kB×5 ips×4 sec=1160 kB=1.16 MB

Therefore, whenever one alarm occurs, an area of 16 MB−1.16 MB=14.84 MB becomes a fruitless area and the use efficiency of the record medium is poor; this is a problem.

In view of the circumstances described above, it is an object of the invention to provide an image record apparatus and an image record method that can improve the use efficiency of a record medium for recording a video image from a camera.

Means For Solving the Problems

An image record apparatus of the invention includes a maximum image size acquisition section that acquires the maximum image size of one pre-record image which can be transmitted by a camera; a number-of-images setting section that sets the number of pre-record images; an area reserving section that reserves an area corresponding to the maximum image size of the one pre-record image acquired by the maximum image size acquisition section in a record medium; a pre-record image record section that records the pre-record image transmitted from the camera in the area of the record medium reserved by the area reserving section; and a record continuation section returns to the beginning of the area of the record medium reserved by the area reserving section and continues to record the pre-record image, when as many pre-record images transmitted from the camera as the number of the pre-record images set by the number-of-images setting section have been recorded.

According to the configuration, the maximum image size of one pre-record image that can be transmitted by the camera is acquired and the area corresponding to the size is reserved in the record medium, so that the use efficiency of the record medium improves and if the record medium has same capacity as the conventional image recording apparatus, the present image recording apparatus can achieve longer record time than the conventional image recording apparatus.

In the configuration, the number-of-images setting section calculates and sets the number of pre-record images based on a preset pre-record rate and a pre-record time of the camera.

According to the configuration, the number of record images can be calculated based on the preset pre-record rate and the pre-record time of the camera.

In the configuration, the image record apparatus includes an alarm occurrence detection section that detects an occurrence of an alarm; and a pre-record image determination section that determines the pre-record image recorded by the pre-record image record section as pre-record data when the alarm occurrence detection section detects the occurrence of the alarm.

According to the configuration, when the occurrence of the alarm is detected, the pre-record image is determined as the pre-record data, so that an image before the alarm occurrence can be recorded reliably.

An image record system of the invention includes a camera that transmits a pre-record image; a maximum image size acquisition section that acquires the maximum image size of one pre-record image which can be transmitted by the camera; a number-of-images setting section that sets the number of pre-record images; an area reserving section that reserves an area corresponding to the maximum image size of the one pre-record image acquired by the maximum image size acquisition section in a record medium; a pre-record image record section that records the pre-record image transmitted from the camera in the area of the record medium reserved by the area reserving section; and a record continuation section returns to the beginning of the area of the record medium reserved by the area reserving section and continues to record the pre-record image, when as many pre-record images transmitted from the camera as the number of the pre-record images set by the number-of-images setting section have been recorded.

According to the configuration, the maximum image size of one pre-record image that can be transmitted by the camera is acquired and the area corresponding to the size is reserved in the record medium, so that the use efficiency of the record medium improves and if the record medium has same capacity as the conventional image recording apparatus, the present image recording apparatus can achieve longer record time than the conventional image recording apparatus.

An image record method of the invention includes a maximum image size acquisition step of acquiring the maximum image size of one pre-record image which can be transmitted by a camera; a number-of-images setting step of setting the number of pre-record images; an area reserving step of reserving an area corresponding to the maximum image size of one pre-record image acquired in the maximum image size acquisition step in a record medium; a pre-record image record step of recording the pre-record image transmitted from the camera in the area of the record medium reserved in the area reserving step; and a record continuation step of returning to the beginning of the area of the record medium reserved by the area reserving section and continuing to record the pre-record image, when as many pre-record images transmitted from the camera as the number of the pre-record images set by the number-of-images setting section have been recorded.

According to the method, the maximum image size of one pre-record image that can be transmitted by the camera is acquired and the area corresponding to the size is reserved in the record medium, so that the use efficiency of the record medium improves and if the record medium has same capacity as the conventional image recording apparatus, the present image recording apparatus can achieve longer record time than the conventional image recording apparatus.

Advantages of the Invention

According to the invention, the use efficiency of the record medium for recording a video image from the camera can be improved and if the record medium is of the same capacity, longer record than was previously possible can be accomplished.

DESCRIPTION OF REFERENCE NUMERALS

Figure 1:
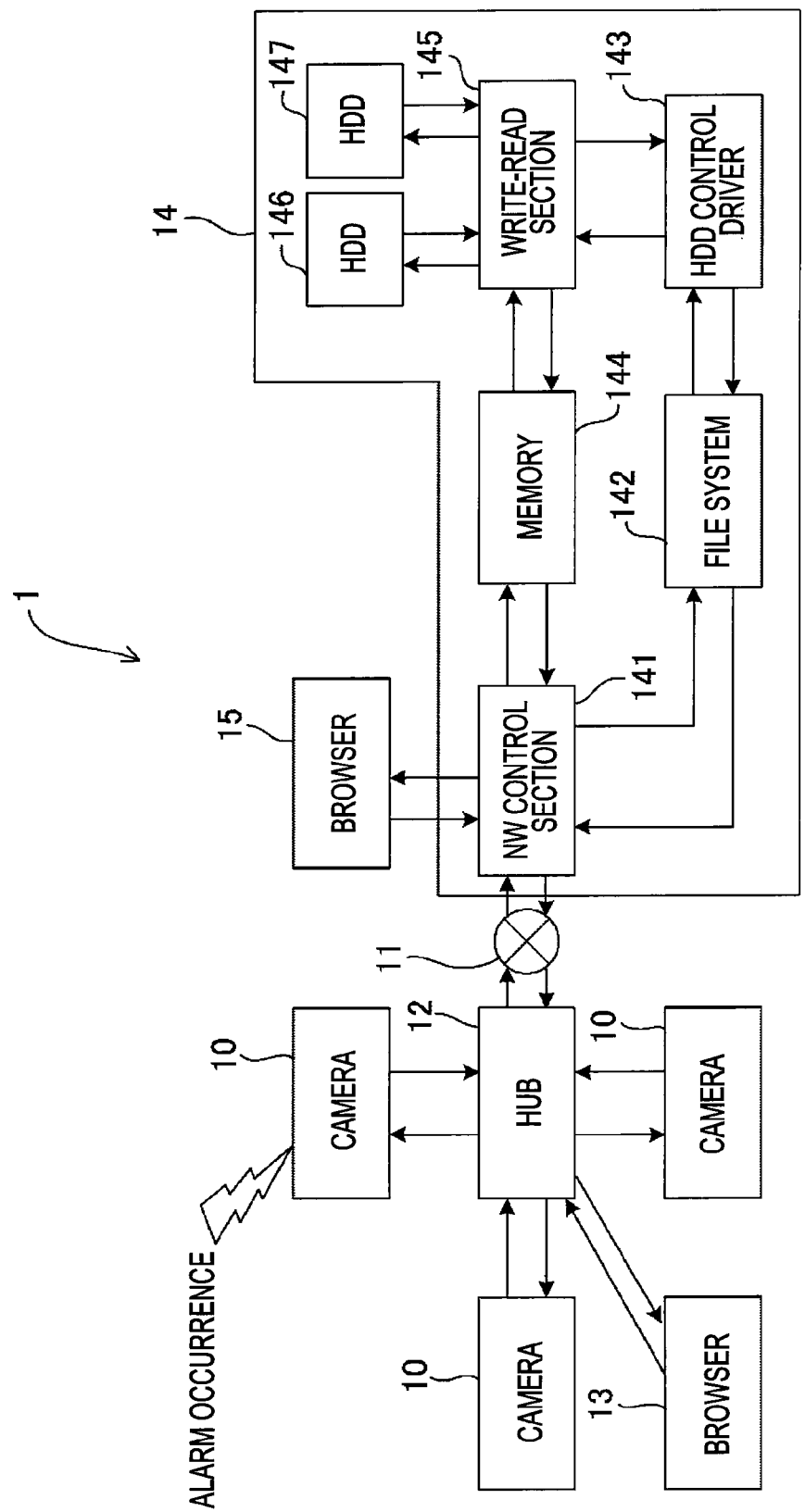
FIG. 1 is a block diagram to show the schematic configuration of an image record system according to one embodiment of the invention.

1 Image record system
10 Camera
11 Ethernet (®)
12 HUB
13, 15 Browser
14 Image record apparatus
141 NW control section
142 File system
143 HDD control driver
144 Memory
145 Write-read section
146, 147 HDD

BEST MODE FOR CARRYING OUT THE INVENTION

A preferred embodiment for carrying out the invention will be discussed below in detail with reference to the accompanying drawings:

FIG. 1 is a block diagram to show the schematic configuration of an image record system according to one embodiment of the invention. In the figure, an image record system 1 of the embodiment includes a plurality of cameras 10, a HUB (line concentrator) 12 for connecting the cameras to Ethernet (registered trademark) 11 at the same time, a browser 13 connected to the HUB 12, an image record apparatus 14 for recording an image (pre-record image) from each camera 10, and a browser 15 connected to the image record apparatus 14.

The camera 10 has a network connection function and connects to Ethernet (registered trademark) 11 through the HUB 11 and transmits a pre-record image to the image record apparatus 14. Each of the browsers 13 and 15 is a PC (personal computer), for example, and sets the pre-record rate, the pre-record time, and the like for each camera for performing pre-record for the image record apparatus 14. The browser 13 sets the pre-record rate, the pre-record time, and the like of the camera 10 at the installation location of the camera 10, and the browser 13 sets the pre-record rate, the pre-record time, and the like of the camera 10 in a monitor center.

The image record apparatus 14 is made up of a NW (Net Work) control section 141, a file system 142, an HDD control driver 143, memory 144, a write-read section 145, a hard disk drive (HDD) 146, and an HDD 147. The NW control section 141 accesses the camera 10 for performing pre-record, acquires the image quality and the resolution set to the camera 10, and calculates the maximum image size that can be transmitted by the camera 10. The file system 142 performs management of the HDD configuration, management of records, and management of images; in management of records, the file system calculates the number of pre-record images from the pre-record rate and the pre-record time. The HDD control driver 143 controls the HDD 146 and the HDD 147 in accordance with each management function of the file system 142.

The memory 144 stores the pre-record rate and the pre-record time set in the browser 13 and the browser 15 and also temporarily stores a pre-record image from the camera 10. The write-read section 145 writes the pre-record image stored in the memory 144 to the HDD 146 or the HDD 147 and reads the pre-record image stored in the HDD 146 or the HDD 147 under the control of the HDD control driver 143.

The NW control section 141 accesses the camera 10 for performing pre-record, acquires the image quality and the resolution set for the camera 10, and calculates the maximum image size that can be transmitted by the camera 10. After calculating the maximum image size, the NW control section reads the pre-record rate and the pre-record time of the camera 10 from the memory 144 and inputs them to the file system 142 together with the maximum image size. The file system 142 multiplies the input pre-record rate by the input pre-record time and determines the number of pre-record images. The file system 142 reserves an area (pre-record area) corresponding to the maximum image size of one pre-record image input from the NW control section 141 via the HDD control driver 143 and the write-read section 145 in the HDD 146 or the HDD 147. In this case, the pre-record area is reserved from the preferentially selected HDD (for example, the HDD 146).

The NW control section 141 writes the pre-record image acquired from the camera 10 for performing pre-record into the memory 144. The pre-record image written into the memory 144 is input to the write-read section 145 and is recorded in the pre-record area of the HDD 146 or the HDD 147 reserved by the file system 142. When as many pre-record images as the number of pre-record images calculated by the file system 142 are recorded, a recording point is returned to the beginning of the pre-record area and a new pre-record image is recorded. Thus, when as many pre-record images transmitted from the camera 10 as the number of pre-record images are recorded, the recording point is returned to the beginning of the pre-record area of the HDD 146 or the HDD 147 and the recording of a pre-record image is continued.

When the NW control section 141 detects occurrence of an alarm in the camera 10 while pre-record is performed, the NW control section 141 determines the pre-record image at the point in time as pre-record data. When the pre-record data is determined, the file system 142 reserves a new pre-record area for the HDD 146 or the HDD 147. After these processes, similar operation is repeated.

The NW control section 141 corresponds to the maximum image size acquisition section, the pre-record image record section, the record continuation section, the alarm occurrence detection section, and the pre-record image determination section, and the file system 142 corresponds to the number-of-image calculation section and the area reserving section.

Figure 2:
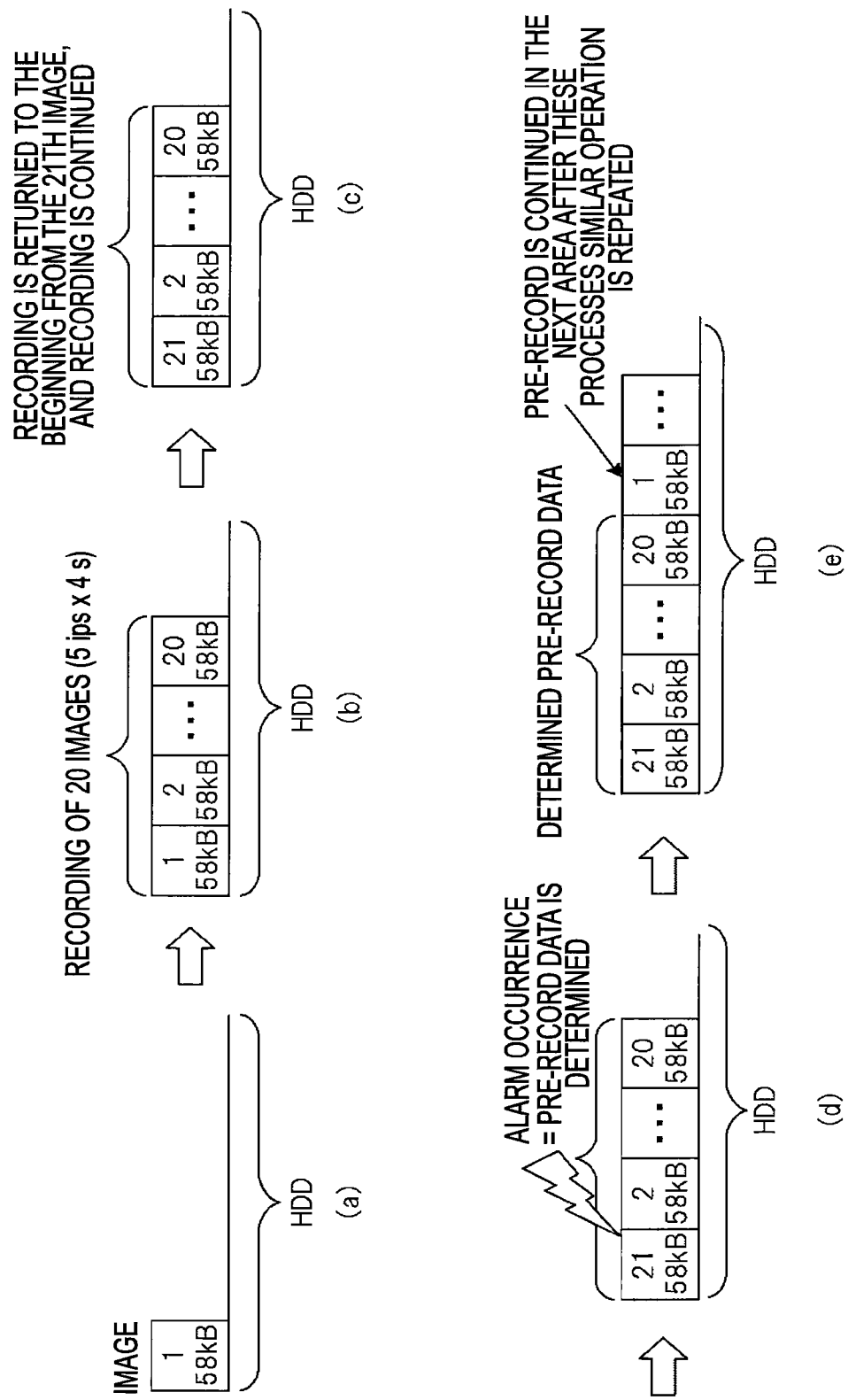
FIG. 2 is a drawing to describe the operation of an image record apparatus in FIG. 1.

FIG. 2 is a drawing to show an example of image record processing when the pre-record rate is 5 ips, the pre-record time is 4 sec, and the maximum image size of the camera 10 is 58 kB. First, one pre-record image (58 kB) is recorded in the pre-record area reserved in the HDD 146 (or the HDD 147) ((a)). 20 pre-record images are recorded ((b)) and from the 21st image, a return is made to the beginning of the pre-record area and recording a pre-record image is continued ((c)). That is, overwrite is executed. For example, assuming that an alarm occurs in the 21st image as shown in (d), 21st, second, third, . . . , 20th pre-record images are determined as the pre-record data. Then, a new pre-record area is reserved and a new pre-record image is recorded in the pre-record area ((e)). After these processes, similar operation is continued.

Figure 3:
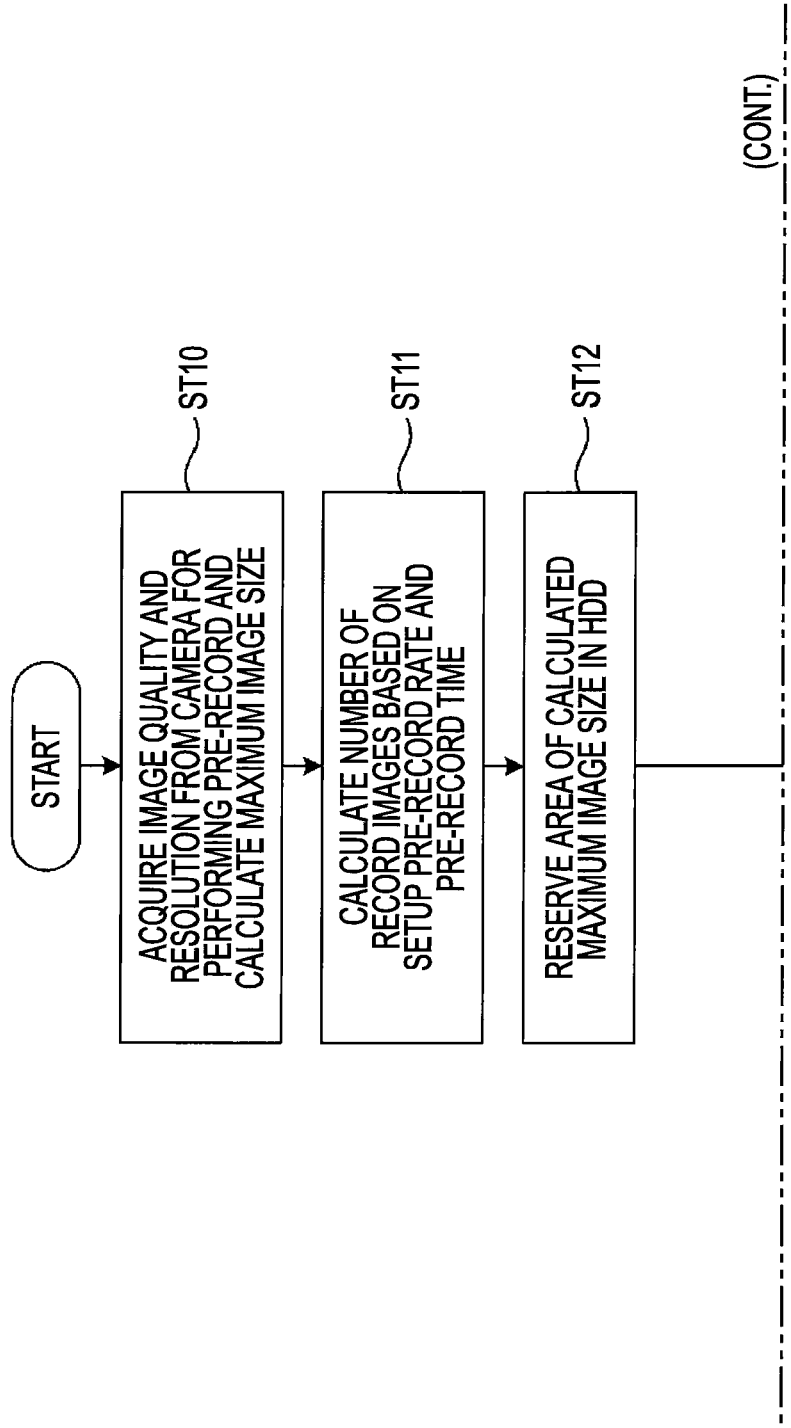
FIG. 3 is a flowchart to describe the operation of the image record apparatus in FIG. 1.

FIG. 3 is a flowchart to show the above-described image record processing. In the figure, first the image quality and the resolution are acquired from the camera 10 for performing pre-record and the maximum image size is calculated (step ST10). Next, the number of pre-record images is calculated from the setup pre-record rate and pre-record time (step ST11). A pre-record area of the calculated maximum image size is reserved in the HDD 146 (step ST12).

After the pre-record area is reserved in the HDD 146, whether or not a video image (pre-record image) can be acquired from the camera 10 performing pre-record (namely, a video image is transmitted from the camera 10) is determined (step ST13) and if a pre-record image cannot be acquired from the camera 10, the determination is repeated until a pre-record image can be acquired. If a pre-record image can be acquired from the camera 10, the first pre-record image is recorded in the reserved pre-record area (step ST14). Next, whether or not as many pre-record images as the calculated number of pre-record images have been recorded in the HDD 146 is determined (step ST15). If the pre-record images are not yet recorded, whether or not an alarm occurs is determined (step ST16) and if an alarm does not occur, the process returns to step ST13 and again a pre-record image is acquired from the camera 10 performing pre-record. When as many pre-record images as the calculated number of pre-record images are recorded in the HDD 146 in a state in which no alarm occurs, a return is made to the beginning of the pre-record area and a new acquired pre-record image is recorded in the pre-record area (step ST17).

The processing at steps ST13 to ST17 is repeated until an alarm occurs. If an alarm occurs while the processing is performed, the pre-record images already recorded in the reserved pre-record area are determined as the pre-record data (step ST18). Next, a new pre-record area is reserved in the HDD 146 and pre-record is continued (step ST19). Then, if an alarm again occurs, the pre-record images already recorded in the new reserved pre-record area are determined as the pre-record data. After this, similar processing is repeated and, for example, when pre-record data is recorded in the full storage capacity of the HDD 146, then data is recorded in the HDD 147.

If settings of the image quality and the resolution are changed in the camera 10, the following operation is performed: In the image record apparatus 14, an area responsive to the image quality and the resolution is reserved for each camera and thus if the image quality and the resolution are changed in the camera 10, it also becomes necessary to change the size of the area. A specific example of changing settings of the image quality and the resolution in the camera 10 is shown below:

(1) The camera 10 notifies the image record apparatus 14 that the image quality and the resolution have been changed (or the maximum image size is entered in the header of the camera 10).

(2) In the image record apparatus 14, upon reception of the notification from the camera 10, formatting of changing the size of the area for recording a pre-record image is performed at the timing. The image record apparatus 14 has an area (spare area) to secure data in the time period performing pre-record area formatting in the HDD 146 (HDD 147) or the memory 144 and saves the data in the spare area during the formatting.

(3) At the termination of the formatting, the data is copied from the spare area to the pre-record area.

(4) After this, pre-record is continued in the pre-record area size secured in the HDD 146 (HDD 147).

As described above, according to the image record system 1 of the embodiment, the NW control section 141 acquires the image quality and the resolution set in the camera 10 performing pre-record and acquires the maximum image size of one pre-record image that can be transmitted by the camera 10, and the file system 142 calculates the number of pre-record images from the preset pre-record rate and pre-record time and reserves the pre-record area corresponding to the maximum image size of one pre-record image calculated by the NW control section 141 in the HDD 146 (HDD 147). Thus, the use efficiency of the HDD 146 (HDD 147) improves and if the HDD is of the same capacity, longer record than was previously possible can be accomplished.

When occurrence of an alarm is detected, the NW control section 141 determines that the pre-record image recorded in the point in time is pre-image data, so that an image before the alarm occurrence can be recorded reliably.

In the embodiment, the number of pre-record images is determined from the preset pre-record rate and pre-record time, but may be set directly in the image record apparatus 14.

In the embodiment, the maximum image size of the camera 10 is set to 58 kB, but is not limited to the value and varies depending on the difference in the image quality and the resolution of the camera 10.

While the invention has been described in detail with reference to the specific embodiments, it will be obvious to those skilled in the art that various changes and modifications can be made without departing from the spirit and the scope of the invention.

This application is based on Japanese Patent Application (No. 2008-050277) filed on Feb. 29, 2008, the content of which is incorporated herein by reference.

Industrial Applicability

The invention has the advantage that it can improve the use efficiency of a record medium for recording a video image from a camera, and can be applied to a monitoring camera system, etc.

The invention claimed is:

1. An image record apparatus, comprising:
   a maximum image size acquisition section that accesses a camera to acquire the maximum image size of one pre-record image which can be transmitted by the camera based on an image quality and a resolution set in the camera;
   a number-of-images setting section that sets the number of pre-record images;
   an area reserving section that reserves an area corresponding to the maximum image size of the one pre-record image acquired by the maximum image size acquisition section in a record medium;
   a pre-record image record section that records the pre-record image transmitted from the camera in the area of the record medium reserved by the area reserving section; and
   a record continuation section that returns to the beginning of the area of the record medium reserved by the area reserving section and continues to record the pre-record image, when as many pre-record images transmitted from the camera as the number of the pre-record images set by the number-of-images setting section have been recorded.

2. The image record apparatus according to claim 1, wherein the number-of-images setting section calculates and sets the number of pre-record images based on a preset pre-record rate and a pre-record time of the camera.

3. The image record apparatus according to claim 1, comprising:
   an alarm occurrence detection section that detects an occurrence of an alarm; and
   a pre-record image determination section that determines the pre-record image recorded by the pre-record image record section as pre-record data when the alarm occurrence detection section detects the occurrence of the alarm.

4. An image record system, comprising:
   a camera that transmits a pre-record image;
   a maximum image size acquisition section that accesses the camera to acquire the maximum image size of one pre-record image which can be transmitted by the camera based on an image quality and a resolution set in the camera;
   a number-of-images setting section that sets the number of pre-record images;
   an area reserving section that reserves an area corresponding to the maximum image size of the one pre-record image acquired by the maximum image size acquisition section in a record medium;
   a pre-record image record section that records the pre-record image transmitted from the camera in the area of the record medium reserved by the area reserving section; and
   a record continuation section that returns to the beginning of the area of the record medium reserved by the area reserving section and continues to record the pre-record image, when as many pre-record images transmitted from the camera as the number of the pre-record images set by the number-of-images setting section have been recorded.

5. An image record method, comprising:
   a maximum image size acquisition step of accessing a camera to acquire the maximum image size of one pre-record image which can be transmitted by the camera based on an image quality and a resolution set in the camera;
   a number-of-images setting step of setting the number of pre-record images;
   an area reserving step of reserving an area corresponding to the maximum image size of one pre-record image acquired in the maximum image size acquisition step in a record medium;
   a pre-record image record step of recording the pre-record image transmitted from the camera in the area of the record medium reserved in the area reserving step; and
   a record continuation step of returning to the beginning of the area of the record medium reserved by the area reserving section and continuing to record the pre-record image, when as many pre-record images transmitted from the camera as the number of the pre-record images set by the number-of-images setting section have been recorded.

* * * * *